United States Patent [19]
Divisek et al.

[11] Patent Number: 6,068,943
[45] Date of Patent: *May 30, 2000

[54] FUEL CELL APPARATUS AND METHOD OF INCREASING THE POWER DENSITY OF FUEL CELLS USING CARBON-CONTAINING FUELS

[75] Inventors: Jiri Divisek, Jülich; Hans-F. Oetjen, Linnich; Volkmar M. Schmidt, Viernheim, all of Germany

[73] Assignee: Forschungszeutrum Jülich GmbH, Jülich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,276

[22] Filed: Dec. 15, 1997

[30] Foreign Application Priority Data

Dec. 17, 1996 [DE] Germany ............... 196 52 341

[51] Int. Cl.[7] ............... H01M 8/00; H01M 8/04; H01M 8/18
[52] U.S. Cl. ............... 429/17; 429/13; 429/19; 429/34
[58] Field of Search ............... 429/13, 17, 19, 429/34, 40, 41

[56] References Cited

U.S. PATENT DOCUMENTS

| | | | |
|---|---|---|---|
| 5,141,823 | 8/1992 | Wright et al. | 429/19 |
| 5,342,702 | 8/1994 | MacGregor | 429/13 |
| 5,401,589 | 3/1995 | Palmer et al. | 429/13 |
| 5,436,086 | 7/1995 | Seymour et al. | 429/17 |
| 5,518,705 | 5/1996 | Buswell et al. | 423/437 |

*Primary Examiner*—Maria Nuzzolillo
*Assistant Examiner*—Tracy Dove
*Attorney, Agent, or Firm*—Klaus J. Bach

[57] ABSTRACT

In a method and an apparatus for processing fuel for a fuel cell to which fuel is supplied through a fuel line, a reactor is disposed in the fuel line and an oxygen-containing compound is added to the fuel in the fuel line and is decomposed in the reactor for releasing oxygen which oxygen is adsorbed by the reactor. Impurities in the fuel which can be oxidized are also adsorbed by the reactor and are oxidized by the oxygen adsorbed by the reactor.

7 Claims, 2 Drawing Sheets

FUEL CELL APPARATUS AND METHOD OF INCREASING THE POWER DENSITY OF FUEL CELLS USING CARBON-CONTAINING FUELS

BACKGROUND OF THE INVENTION

The invention resides in a method of treating carbon containing fuels for fuel cells and to a fuel cell for performing the method.

A fuel cell includes a cathode, an electrolyte and an anode. An oxidation medium such as air, is supplied to the cathode and fuel, such as carbon, is supplied to the anode by way of supply lines.

The operating temperature of a fuel cell using a proton conductive membrane as an electrolyte is about 80° C. Such a fuel cell is known under the designation PEM fuel cell. At the anode of such a PEM fuel cell, hydrogen ions are formed in the presence of fuel by means of a catalyst consisting of platinum or a platinum-ruthenium alloy. The hydrogen ions pass through the electrolyte and are combined at the cathode side with the oxygen from the oxidation agent to form water. In the process, electrons are released generating electric energy.

The catalyst of an anode, which is known for example from the printed publication, Journal of Physical Chemistry, Vol. 99 (1995), pages 8290, and 16757 will be designated below as anode catalyst.

Hydrogen can be obtained by reforming from methanol or methane. It is disadvantageous that such a synthesized gas contains impurities, particularly in the form of carbon monoxide. It is further known from the printed publication "JOURNAL OF POWER SOURCES", Vol. 29, 1990, page 251, that carbon monoxide impurities deleteriously affect the functioning of the anode catalyst. The power output of a fuel cell drops as a result, particularly at operating temperatures of 80° C.

To avoid poisoning of the anode catalyst by carbon monoxide, it is known from the printed publication "THE ELECTROCHEMICAL SOCIETY", Vol. 135 (1988), page 2651 to inject oxygen into the fuel gas.

However, it is a disadvantage that, with the addition of oxygen to the fuel gas atmost care must be taken that the ignition limit for the hydrogen-oxygen mixture is not exceeded.

It is the object of the present invention to provide a method and a fuel cell by which power output losses resulting from impurities in the fuel can be avoided safely and in a simple manner.

SUMMARY OF THE INVENTION

In a method and a fuel cell apparatus for processing fuel for a fuel cell to which fuel is supplied through a fuel line, a reactor is disposed in the fuel line and an oxygen containing compound is added to the fuel in the fuel line and is decomposed in the reactor for releasing oxygen which oxygen is adsorbed by the reactor. Impurities in the fuel which can be oxidized are also adsorbed by the reactor and are oxidized by the oxygen adsorbed by the reactor.

Preferably, the oxygen containing compound is added to fuel for the fuel cells in such a way that the oxygen is released. In this way, atomic or molecular oxygen is present in the fuel. Any impurities in the fuel, which can be oxidized, particularly carbon monoxide, are oxidized with the oxygen. Carbon monoxide accordingly is converted to carbon dioxide.

As a result of the oxidation of the impurities energy losses of a fuel cell are at least reduced.

Suitable oxygen-containing compounds, which are capable of releasing oxygen are particularly $H_2O_2$ or compounds which release $H_2O_2$ such as peroxo monosulfuric acid, peroxide of the alkali- or alkaline earth metals in an acid solution, perborate or percarbonate of the alkali- and alkaline earth metals.

Oxygen containing compounds can be catalytically decomposed in order to release oxygen. Hydrogen peroxide for example can be decomposed to water and oxygen by way of finely distributed silver, gold, platinum, pyrolusite, iron and copper salts, dust particles, alkaline metals, activated carbon, potassium iodide, and generally also by compounds which have a rough surface.

As fuel for the fuel cells, any material could be utilized which, under certain conditions, can be reformed and which subsequently is supplied to the anode of a fuel cell (in the form of the product of the reformation reaction) for the generation of electric current.

For example, carbon-containing fuels include impurities, which can be oxidized. Examples of fuels which can be treated in accordance with the invention are particularly carbon monoxide-containing, hydrogen-rich gases, methanol and ethanol.

An impurity as to be understood in the present case is a material which is contained in the fuel and which leads to an energy output loss of the fuel cell. The reason for such an energy loss is an impairment of the anode catalyst.

The impurity, that is particularly of the carbonmonoxide can be oxidized in the anode chamber of the fuel cell together with the electrochemical oxidation of hydrogen at the surface of the anode catalyst. Then however, parasitic recombination reactions of oxygen and hydrogen to water in the anode chamber are unavoidable resulting in a reduction of the fuel gas utilization.

The process can furthermore be performed spatially separated from the fuel cell while processing a fuel for fuel cells. The fuel processed in accordance with the invention may first be contained in an interim storage and supplied to the fuel cell as needed. With the conversion according to the invention of impurities contained in the fuels that is particularly with the conversion of carbon monoxide to carbon dioxide, poisoning of the anode catalyst of a fuel cell and, consequently, losses in the energy output of the fuel cell can be prevented in a simple manner.

The method according to the invention is substantially safer than the injection into the fuel of pure oxygen for the following reasons: hydrogen with a content of 4 vol % of pure oxygen is ignitable. The admixing of oxygen-containing compounds as it is proposed by the present invention is substantially safer since it requires substantially higher concentrations to form an explosive mixture.

In a preferred embodiment of the invention the oxygen is adsorbed together with the oxidizable impurities. This adsorption enhances the oxidation of the impurities.

A reactor as to be understood herein is an apparatus, which facilitates the adsorption and the subsequent oxidation according to the invention. The reactor includes specifically a catalyst which initiates the oxidation reaction. Preferably, the catalyst is so selected that recombination reactions between the hydrogen and the oxygen do not occur. This is then the case if there is relatively little recombination at the anode catalyst as compared to the recombination at the anode catalyst with pure oxygen added to the fuel.

In an advantageous embodiment of the invention, the oxygen containing compound according to the invention is a liquid.

As compared to pure gaseous oxygen liquids are easy to store and unproblematic to handle. Storage and handling problems are therefore small with a liquid, oxygen-containing compound.

Liquid oxygen-containing compounds can furthermore be easily mixed with the liquid fuel. In this respect, the liquid oxygen-containing compound is also advantageous in comparison with oxygen. It is noted that gaseous oxygen can hardly be mixed with liquid fuel. In practice, the known method, which utilizes the addition of pure oxygen to the fuel can be utilized only in combination with gaseous fuel. This limitation is eliminated with the addition of a liquid oxygen-containing compound.

The object of the invention is further solved by a fuel cell which—in contrast to the fuel cell defined initially—includes a separate reactor. The reactor according to the invention is so designed that it can provide for the release of oxygen from an oxygen-containing compound and an adsorption of the released oxygen. This reactor is capable of adsorbing impurities in the fuel which can be oxidized. Furthermore, the reactor according to the invention causes an oxidation of all the impurities which can be oxidized.

A fuel supply line is to be understood to be any type of line which conducts the fuel into the anode space. The anode space is the space in which the anode of the fuel cell is disposed.

As a result of the adsorption of oxygen and of the impurities which can be oxidized, the reactor according to the invention promotes the desired oxidation reaction.

The reactor includes particularly a catalyst which promotes the release of oxygen from $H_2O_2$ and which catalyses the conversion reactions.

$$CO + H_2O_2 \rightarrow CO_2 + H_2O$$

This catalyst is called herein reactor catalyst. Examples for such catalysts are substances consisting of pyrolusite, iron and copper salts.

Preferably, the reactor catalyst has a surface which is as large as possible. Consequently, it is preferably porous. With increasing surface the effects of the reactor mentioned earlier or improving.

For example, carbon monoxide adsorbed by the reactor is, in the presence of the oxygen containing compound which is also adsorbed by the reactor, catalytically converted to carbon dioxide. The gaseous carbon dioxide escapes. As a result, the poisoning of the anode catalyst is avoided.

It is known to wet gaseous fuel, after its reformation, with water and subsequently supply it to the anode of a fuel cell. In one embodiment of the invention, the oxygen-containing compound is added to the water in a dosed fashion.

In another embodiment of the invention the fuel supply line has an entrance port. The entrance port serves to permit the addition of an oxygen-containing compound to the fuel. In this case, the reactor is located between the entrance port and the anode space. Preferably, it is disposed close to the entrance port in order to provide for the desired oxidation of the impurities as soon as possible.

In another embodiment of the invention, a dosing and control unit is provided for controlling the amount of the oxygen-containing compound admixed to the fuel.

The dosed admission of an oxygen-containing compound is controlled preferably dependent on the contact voltage of the fuel cell. If the voltage is below a characteristic value the oxygen containing compound is fed into the fuel supply line in order to prevent energy output losses. The dosage is further so controlled that no explosive mixture is formed.

The reactor includes for example activated carbon. $MnO_2$, $CO_3O_n$, NiO, CuO, ZnO, $TiO_2$, $Fe_2O_3$, $V_2O_5$ or $Cr_2O_3$. The decomposition reaction of the oxygen-containing compounds can be catalizeld by the materials mentioned and the adsorbed impurities are oxidized by the oxygen, which is also adsorbed.

In an advantageous embodiment of the invent-on, the reactor catalyst does not catalyze the parasitic combination reaction possible between the hydrogen and the oxygen $$H_2 + \tfrac{1}{2}O_2 \rightarrow H_2O$$

With the reactor, the conversion reaction cf for example carbon monoxide to carbon dioxide is separated spatially from the reaction occurring at the anode. As a result, there are—in contact to the known oxygen admission at the anode—no parasitic recombination reactions between hydrogen and oxygen caused by the anode catalyst. The earlier mentioned preferred selection of the reactor catalyst results in a measurable clear elimination of undesirable recombination reactions between hydrogen and oxygen as compared to the state-of-the-art. Parasitic reactions, which would reduce the fuel gas utilization are accordingly avoided. As a result, the fuel gas utilization is improved. The fuel gas utilization is even better than it is with the known oxygen addition since with the state of the art technique parasitic reactions occur between the hydrogen and the oxygen.

Examples for reaction catalysts which, in the sense mentioned earlier, do not catalyze the reaction $H_2 + \tfrac{1}{2}O_2 \rightarrow H_2O$ are activated carbon, $MnO_2$, $CO_3O_n$, NiO, CuO, ZnO, $TiO_2$, $Fe_2O_3$, $V_2O_5$ or $Cr_2O_3$.

The major advantage of the method and the apparatus according to the invention in comparison with the prior art using the addition of oxygen, however, resides in a much increased safety of the system. No large amounts of oxygen are added to the system. Peroxide containing aqueous solutions present no particular safety risk up to a content of 20 mol % $H_2O_2$ (Ullman's Encyclopedia of Industrial Chemistry, Fifth, Completely revised edition, Vol A13, VCH, page 461). As a result, the solution can be transported and stored without any problems. The explosion limit for liquid solutions of $H_2O_2$ and $H_2O$ is given as about 26 mol % $H_2O_2$ in the vapor phase (Ullman's encyclopedia of Industrial Chemistry Fifth Completely Revised Edition, Vol. A13, VCH Page 462). With higher $H_2O_2$ concentrations, the transport and storage container can be made of a suitable material preferably of passivated aluminum or aluminum-magnesium alloys, passivated stainless steel or polyethyline (Ullman's encyclopedia of Industrial Chemistry Fifth Completely Revised Edition, Vol. A13, VCH Page 461) The amount of oxygen needed for the oxidation of the carbon dioxide can be controlled by the addition of a peroxide-containing solution to the fuel flow. In this way, relatively large amounts of CO in the fuel can be oxidized as compared to a method wherein CO-tolerant electrocatalysts are used for the anodes as means to increase the energy output density of a fuel cell. For this reason, the method according to the invention is particularly suitable for fuel cell systems with carbon-containing fuel for mobile applications that is in vehicles. In this manner, the fuel system can be of compact design and requires no expensive fuel processing. The process is also suitable for stationary applications, since there are no problems with the storage of the peroxide-containing solutions also of higher peroxide concentrations.

The method and the apparatus can basically be used for any impurities, which can be oxidized such as methanol, ethanol, and higher alcohols, ether compounds, ester compounds or organic acids. Fuels can be made by reformation from methanol, ethanol, natural gas, crude oil, and crude oil fractions, propane or butane. The invention as claimed is particularly concerned with fuel cells which are operated by liquid or gaseous fuels. For example methanol, ethanol, higher alcohols, aldehydes and organic acids can be employed if these compounds are directly supplied to the fuel cell. If as oxygen-containing compound a solution with a peroxide concentration >20 mol % is used, it is advisable to add to such a solution a stabilizing agent preferably sodium pyrophosphate or sodium stannate.

DESCRIPTION OF A PREFERRED EMBODIMENT

Figure 1:
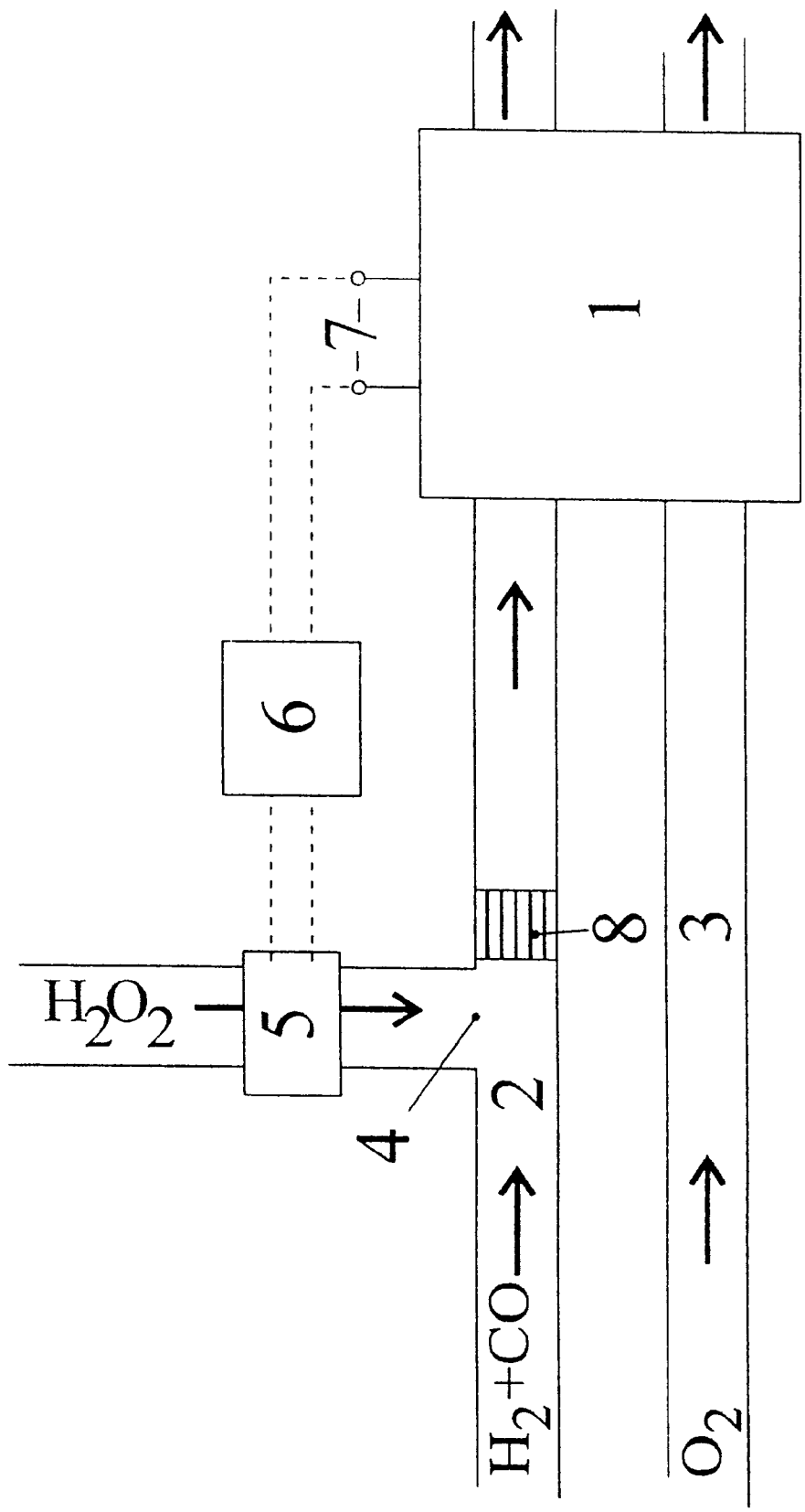
FIG. 1 shows schematically a preferred embodiment of the apparatus according to the invention.

As shown in FIG. 1, a fuel cell 1 has a fuel supply line 2 and an oxidant supply line 3. The fuel supply line 2 includes a port 4 upstream of which a dosing apparatus 5 is disposed. The dosing apparatus 5 is connected by electric wires to a control unit 6 and the control unit 6 is connected by electric wires to contacts 7 of the fuel cell 1. The control unit 6 senses the voltage present at the fuel cell contacts. It controls the dosing apparatus 5 depending on the voltage measured at the contacts 7. Between the port 4 and the fuel cell 1, there is a reactor 8 arranged within the fuel supply line 2.

In the manner as already described, the reactor 8 is used to process fuel with impurities, which is supplied to the fuel cell.

As membrane-electrode unit consisting of gas diffusion electrodes for the anode and the cathode and a polymer solid electrolyte membrane wire mounted in a cell. It was used as a fuel cell 1 to which different fuel gases were supplied. Oxygen was used as the oxidation material. This fuel cell could be operated at various operating pressures. In one case, the pressure was 0.2–0.3 MPa. The cell temperature was 80° C. gas diffusion electrodes made in accordance with a suitable process of platinum or a platinum alloy were used as cathode catalysts specifically $Pt_o$, $_7Ru_{o.3}$. The catalyst coating on each electrode can be between 0.01–10 mg/cm$^2$. In the present case it was about 1 mg/cm$^2$. Naf ion 117$^R$ was used for the solid electrolyte membrane.

Figure 2:
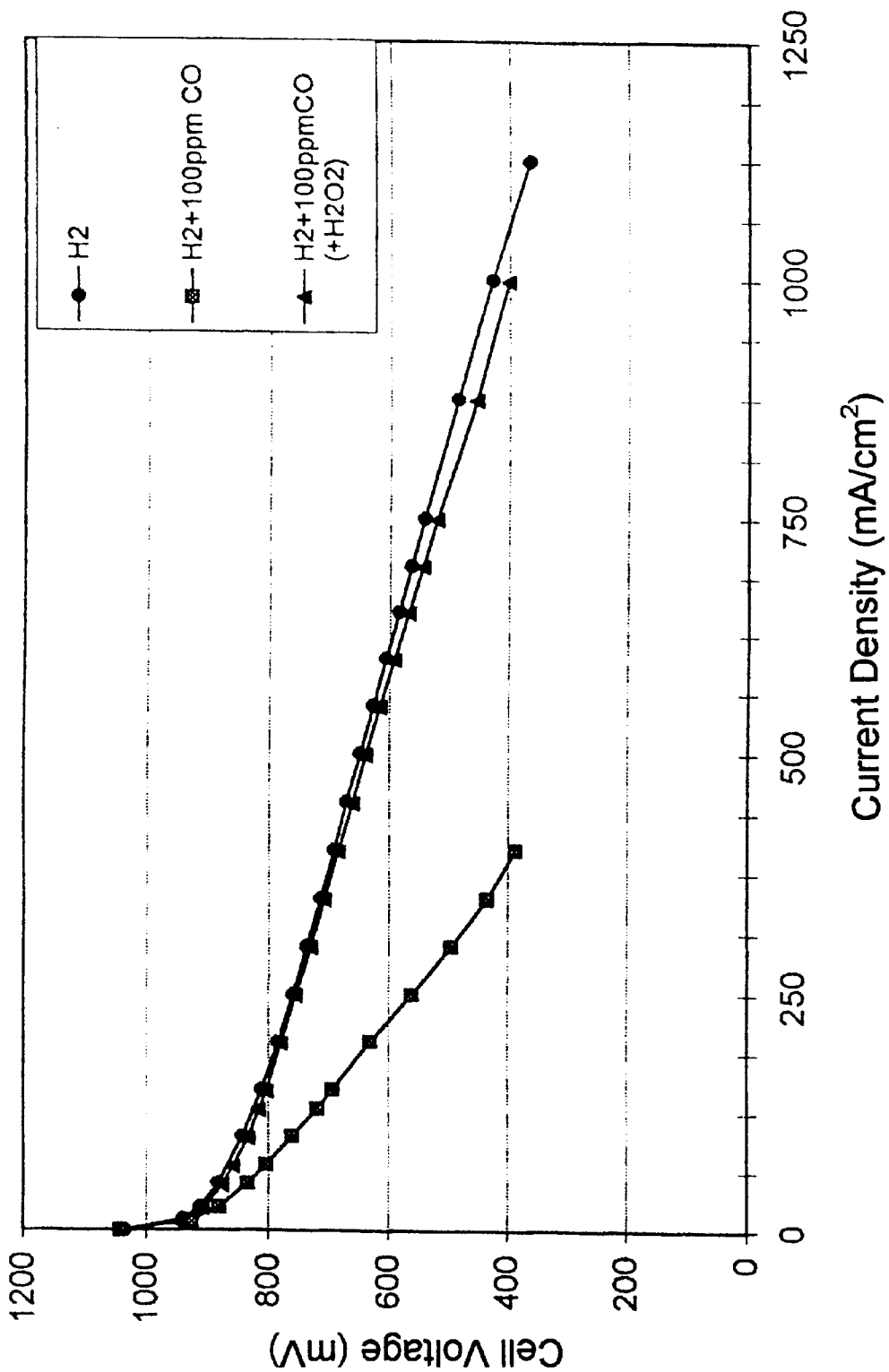
FIG. 2 shows test results.

The results of tests with this fuel cell are shown in FIG. 2. Under the operating conditions given a current density curve was measured of the contacts 7 utilizing pure hydrogen and oxygen as shown in FIG. 2. If the fuel gas contained 100 ppm CO, there was a noticeable energy output loss. The current density at the contact points 7 was clearly lower than that measured with pure hydrogen as fuel gas.

If a fuel cell with an apparatus for the addition of an oxygen-containing compound was used the energy output density of the fuel cell was significantly improved with the use of CO-containing hydrogen as fuel gas. With a fuel mixture of hydrogen and 100 ppm carbon monoxide, the same energy output density was measured as with pure hydrogen. For this purpose, an aqueous hydrogen peroxide solution was supplied by the dosing apparatus 5 to the fuel supply line 2 by way of the port 4. The concentration of the hydrogen peroxide was varied as needed (0.01–20mol % $H_2O_2$) oxygen was admitted through the supply line 3.

The apparatus according to the invention which includes the reactor 8 can of course be operated also with pure oxygen instead of an oxygen-containing compound. Some of the effects mentioned such as the adsorption and the catalysis will occur also if pure oxygen is utilized.

What is claimed is:

1. A method of processing liquid fuel for fuel cells, comprising the steps of:
   a. adding to the fuel an oxygen-containing liquid compound,
   b. decomposing the oxygen-containing liquid compound so as to release oxygen, and
   c. oxidizing with said oxygen any oxidizable impurities in said fuel.

2. A method according to claim 1, wherein said oxygen-containing liquid compound is adsorbed together with said oxidizable impurities in a reactor where said impurities are oxidized by the oxygen released from said oxygen-containing liquid compound.

3. A fuel cell apparatus including a fuel supply line for supplying liquid fuel to said fuel cell apparatus, a reactor disposed in said fuel supply line, means for supplying to said reactor an oxygen-containing liquid compound, said reactor being capable of releasing oxygen from said oxygen-containing liquid compound and said reactor including means for adsorbing said oxygen-containing liquid compound and also said oxygen released from said oxygen-containing liquid compound together with said impurities, which are oxidized in said reactor by said oxygen thereby providing fuel free of impurities, which can be oxidized.

4. A fuel cell apparatus according to claim 3, wherein said reactor includes a reaction catalyst which catalyzes the oxidation of said impurities, but not the reaction $H_2+O_2 \rightarrow H_2O$.

5. A fuel cell apparatus according to claim 3, wherein said fuel supply line is connected to said reactor and includes a port and said reactor is arranged between said port and said fuel cell.

6. A fuel cell apparatus according to claim 3, wherein a supply line is connected to said port for carrying an oxygen-containing liquid compound to said port, a dosing apparatus is disposed in said supply line and a control unit is connected to said dosing apparatus and to said fuel cell so as to determine the voltage of said fuel cell and to control said dosing apparatus depending on the fuel cell voltage.

7. A fuel cell apparatus according to claim 3, wherein said fuel cell includes a proton-conducting membrane as an electrolyte.

* * * * *